Figure 1:
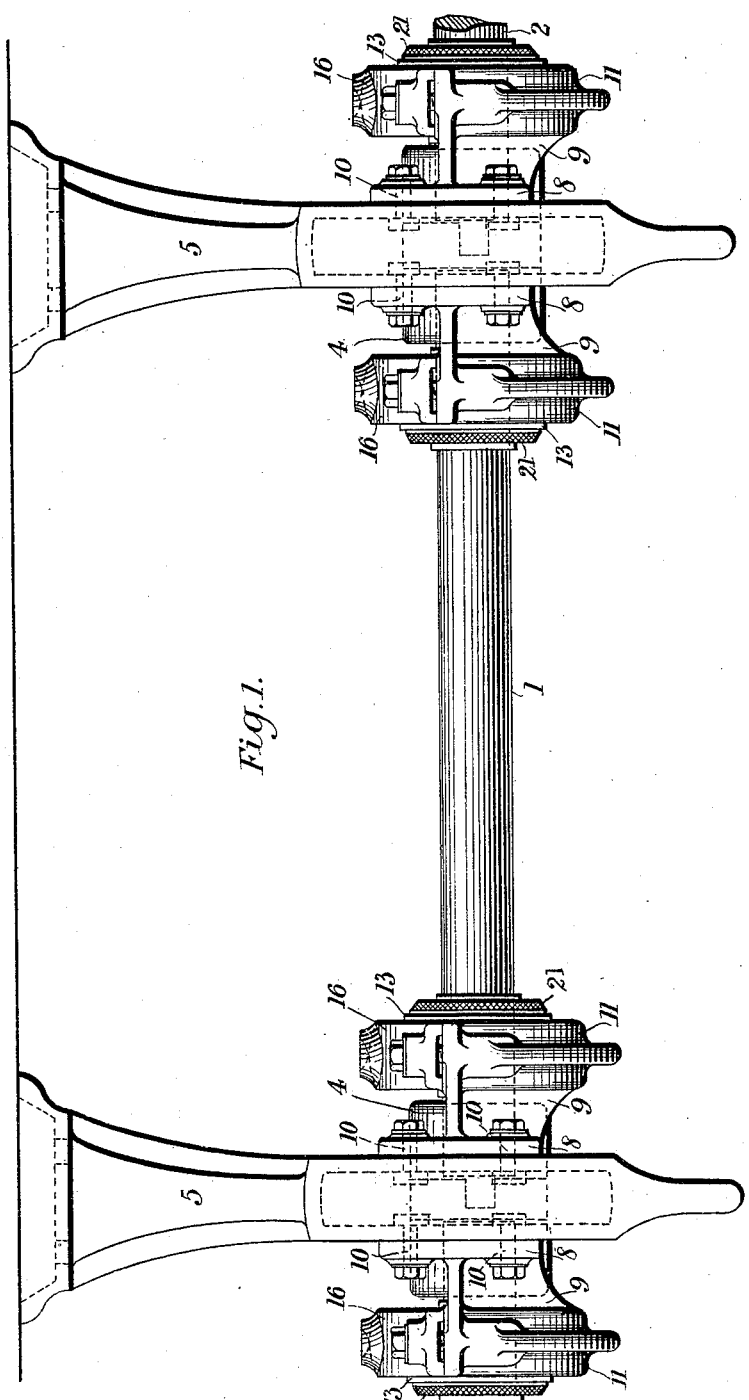

No. 695,086. Patented Mar. 11, 1902.
F. W. WITTE.
SHAFT HANGER AND BEARING.
(Application filed Apr. 4, 1901.)
(No Model.) 2 Sheets—Sheet 1.

WITNESSES. INVENTOR.
Lucius E. Warner. Frederick William Witte
A. N. Jesbera by Redding, Kiddle Greeley
Attys No. 695,086. Patented Mar. 11, 1902.
F. W. WITTE.
SHAFT HANGER AND BEARING.
(Application filed Apr. 4, 1901.)
(No Model.) 2 Sheets—Sheet 2.
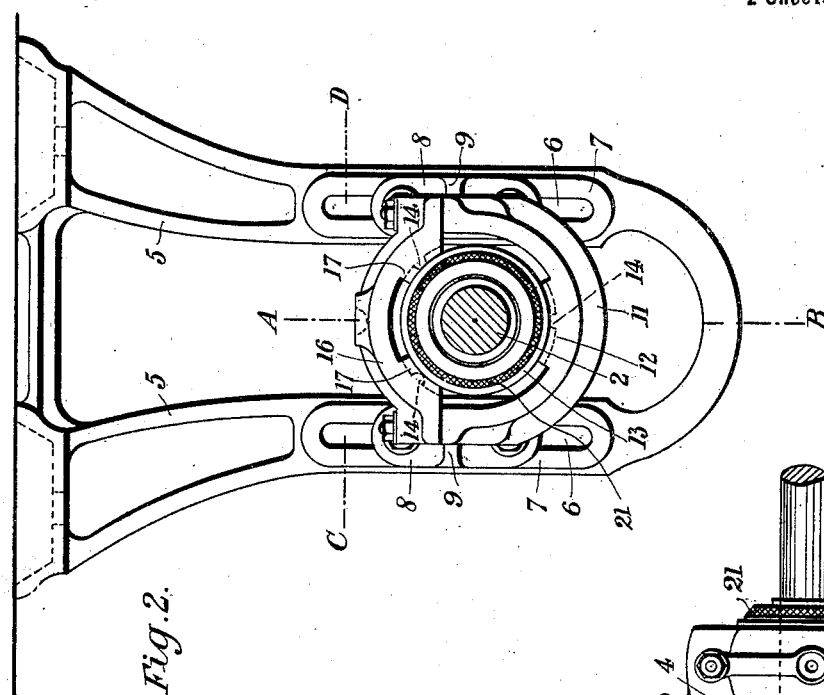
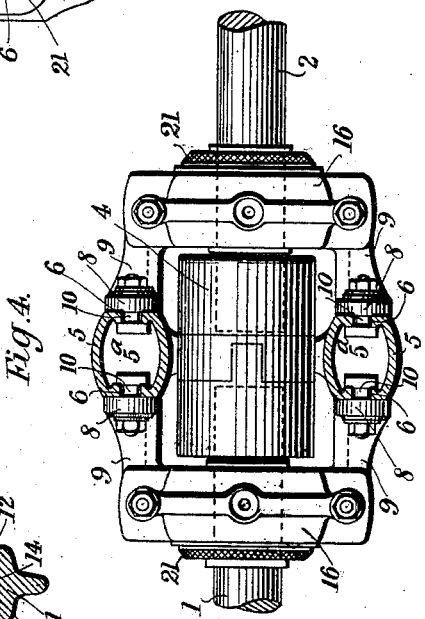
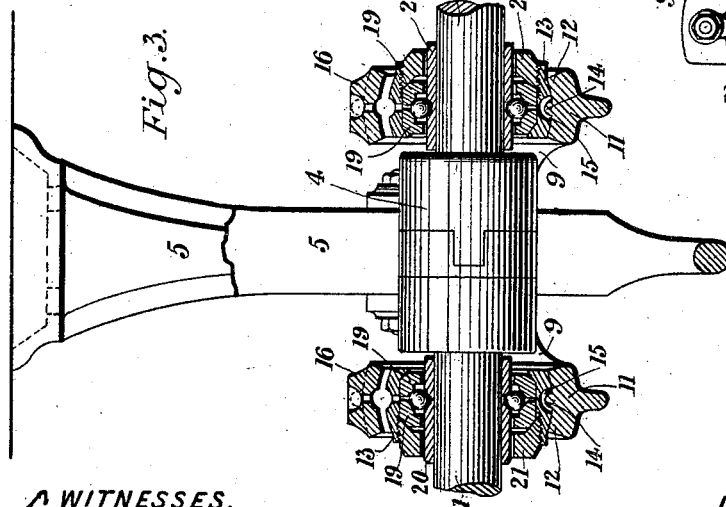
WITNESSES. Lucius E. Varney, A. S. Jesbera
INVENTOR. Frederick William Witte by Redding, Kiddle & Greeley Attys.

UNITED STATES PATENT OFFICE.

FREDERICK WILLIAM WITTE, OF CHELMSFORD, ENGLAND.

SHAFT HANGER AND BEARING.

SPECIFICATION forming part of Letters Patent No. 695,086, dated March 11, 1902.

Application filed April 4, 1901. Serial No. 54,243. (No model.)

*To all whom it may concern:*

Be it known that I, FREDERICK WILLIAM WITTE, a citizen of the United States of America, residing at Chelmsford, in the county of Essex, England, have invented a certain new and useful Improvement in Shaft Hangers and Bearings, of which the following is a specification.

My invention relates to an improvement in shaft hangers and bearings, the object being to provide a convenient means of carrying shafting, so that it may be readily put up and taken down in sections, the hangers being provided with bearings which enable the shaft-sections to adjust themselves to any inequalities in the general line of the part to which the hangers are attached.

In the accompanying drawings the arrangement is illustrated in connection with hangers depending from a ceiling or like part.

In the drawings, Figure 1 is a general view showing two hangers, a shaft-section between, and portions of shaft-sections extending in the opposite directions. Fig. 2 is an end elevation of one of the hangers shown in Fig. 1. Fig. 3 is a sectional elevation of Fig. 2 on the line A B, the shaft-clutch being in elevation; and Fig. 4 is a sectional plan on line C D of Fig. 2.

The shafting is in sections 1 2 3, as shown, and the ends of the adjoining sections are connected by a clutch or coupling 4 of any suitable form, that shown being a well-known type, which it is not necessary to describe here. The clutch is centrally situated between the two arms 5 5, forming the hanger, such arms having a cavity 5ª 5ª and having through them and connected with the cavity slots 6 with planed faces 7 outside, adapted to form seats for blocks 8 8, which are parts of brackets 9, the blocks carrying bolts 10, which pass through the slots 6, said bolts having headed ends to engage inside the walls of the cavities 5ª, and nuts by which the blocks and bracket may be held to the arms 5. The brackets 9 connect by a part 11, in which the bearing for each shaft end is carried. This part 11 has a projection 12, forming a seat for the bearing, said projection having a face which is curved in all directions, as a segment of a sphere, and corresponds as regards said curvature to the outer face of a casing 13, carrying the bearing for the shaft. A lug 14 is provided on the face of the projection 12, and the casing 13 has a hole 15 of larger diameter to receive same, such lug acting to prevent the entire rotation of the casing 13. The part 11 thus forms a plumber-block and is provided with a cap 16, which is suitably bolted thereto and has projections 17 17 similarly curved to the projection 12, such projections bearing on the casing 13. The projections 17 may also have, if desired, lugs 14 similar to the lugs 14 on the projection 12 which engage the casing 13. This casing 13 carries inside two rings 19 19, inclosing a series of balls which bear on a race in a sleeve 20 on the shaft, the whole forming a four-point ball-bearing which is adjustable by a lock-nut 21.

Each shaft-section being held as above described is thus capable of rotation in its bearings, and by reason of the spherical seat provided for the outer spherical face of the ball-bearing casing is also capable of rocking in all directions to adjust itself to inequalities in the position of the hangers, while the slots 6 in the hangers provide means for a larger vertical adjustment.

By removing the caps 16 and removing the coupling 4 any shaft-section can be lifted out with its bearings complete, and these can be in turn slid off the ends of the shaft without disturbing any of their parts, so that repairs and the replacing of the parts is conveniently effected.

What I claim is—

1. In a system of line-shafting the combination of two independent shafting-sections and independent bearings, of two independent brackets carried by the hanger for carrying such bearings and connecting means between such brackets and hanger allowing of independent adjustment of the brackets and shafting.

2. In combination, a shaft-hanger, a bracket forming a plumber-block on each side of same, each having a spherical seat, means for independently adjusting the position of each block on the hanger, a shaft-section for each block, a bearing for each section, having a spherical face, and a coupling for the adjacent ends of the shaft-sections.

In testimony whereof I have hereunto set my hand in the presence of two subscribing witnesses.

FREDERICK WILLIAM WITTE.

Witnesses:
E. COTSWORTH,
ALLEN PARRY JONES.